United States Patent [19]
Stas et al.

[11] Patent Number: 5,108,150
[45] Date of Patent: Apr. 28, 1992

[54] HEAD REST AND NECK SUPPORT ASSEMBLY

[75] Inventors: Ralph H. Stas, Belle Mead, N.J.; Siegfried Maisenhalder, Langenhagen, Fed. Rep. of Germany

[73] Assignee: Ralph Stas, Belle Mead, N.J.

[21] Appl. No.: 615,601

[22] Filed: Nov. 19, 1990

Related U.S. Application Data

[63] Continuation-in-part of Ser. No. 320,326, Mar. 8, 1989, Pat. No. 4,971,393.

Foreign Application Priority Data

Jun. 12, 1988 [DE] Fed. Rep. of Germany ....... 3841024

[51] Int. Cl.$^5$ .............................................. A47C 7/38
[52] U.S. Cl. ...................................... 297/397; 297/406
[58] Field of Search ................. 297/391, 397–399, 297/406, 407, 114, 395, 117, 405

[56] References Cited

U.S. PATENT DOCUMENTS

| | | | |
|---|---|---|---|
| 671,300 | 4/1901 | Sibley | 297/405 |
| 792,669 | 6/1905 | Schaff | 297/394 |
| 866,753 | 9/1907 | Weber | 297/405 |
| 893,016 | 7/1908 | Ritter | 297/405 X |
| 2,306,334 | 12/1942 | Costas | 297/407 |
| 3,090,648 | 5/1963 | Snyder | 297/398 |
| 4,881,777 | 11/1989 | Dorshimer | 297/406 |

Primary Examiner—Peter R. Brown
Attorney, Agent, or Firm—Blum Kaplan

[57] ABSTRACT

The present invention relates to an improved head rest and neck support assembly for seating furniture. The assembly contains an elongated support bar which is mounted horizontally to the seating furniture behind the neck of a prospective user. One end of the support bar has a pivoting carrying element with a cushion attached thereto. The cushion may swivel between a neck support position and a side head rest position. In a second embodiment, the elongated support bar in the assembly has a groove running the length of the bar. The cushion is also elongated and possesses a track or partial track which cooperates with the groove in the elongated support bar to allow the elongated cushion to slide horizontally along the bar. A portion of the track is capable of exiting the groove and allowing the elongated cushion to bend into an L-shape.

3 Claims, 8 Drawing Sheets

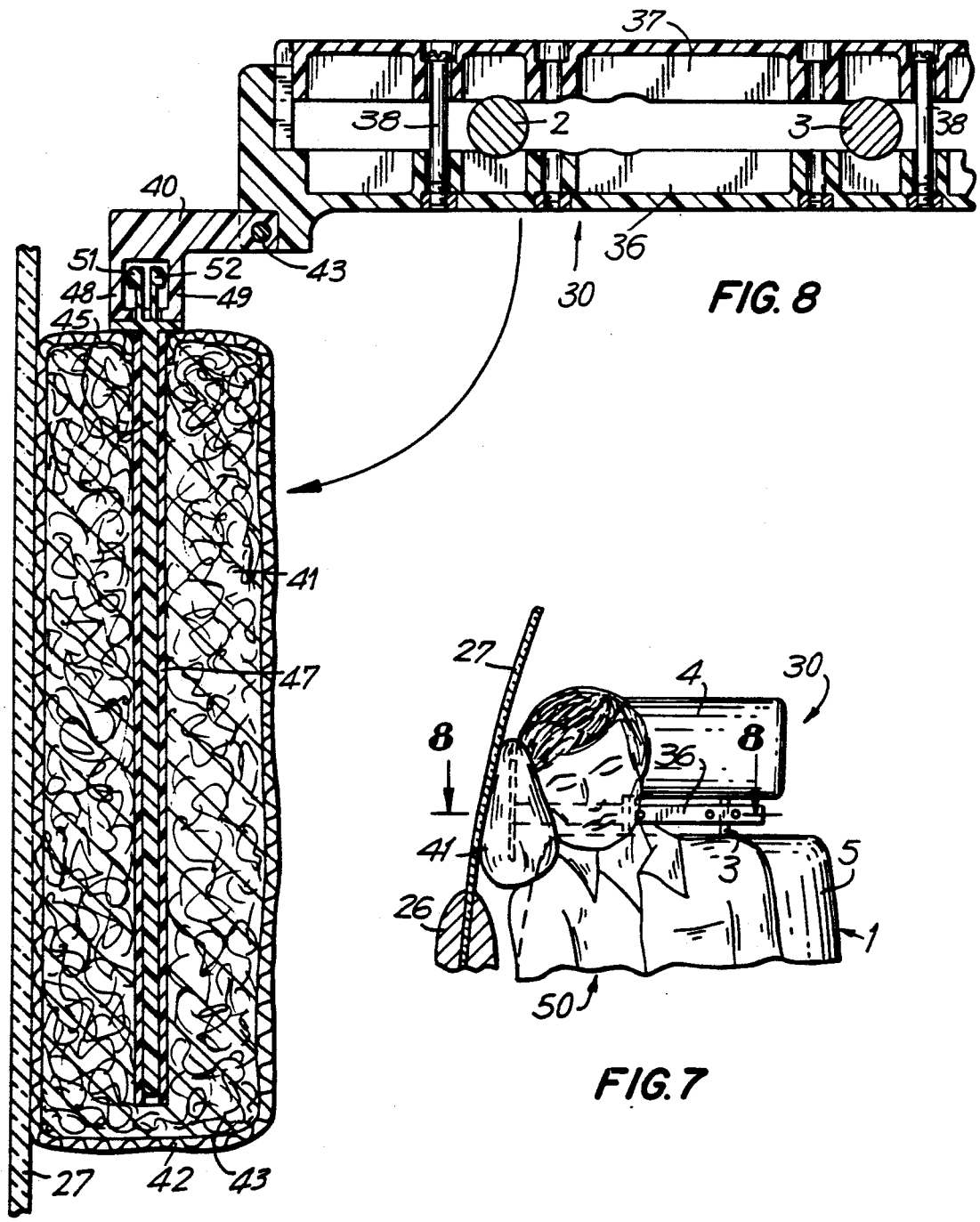

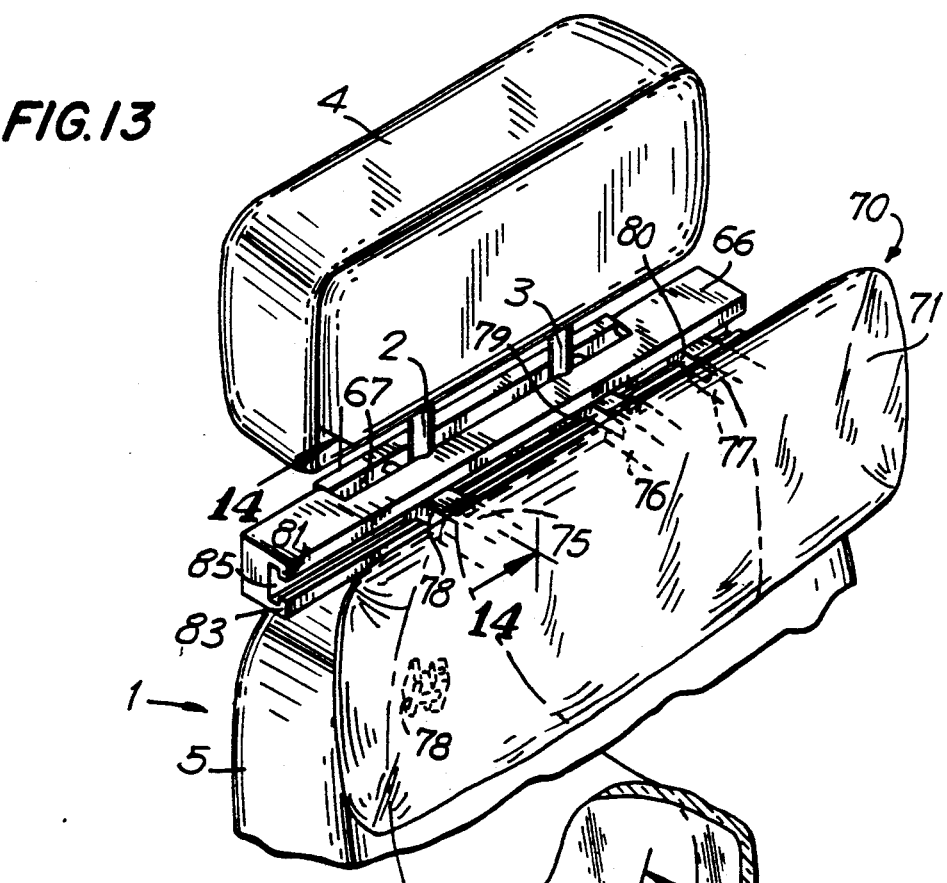
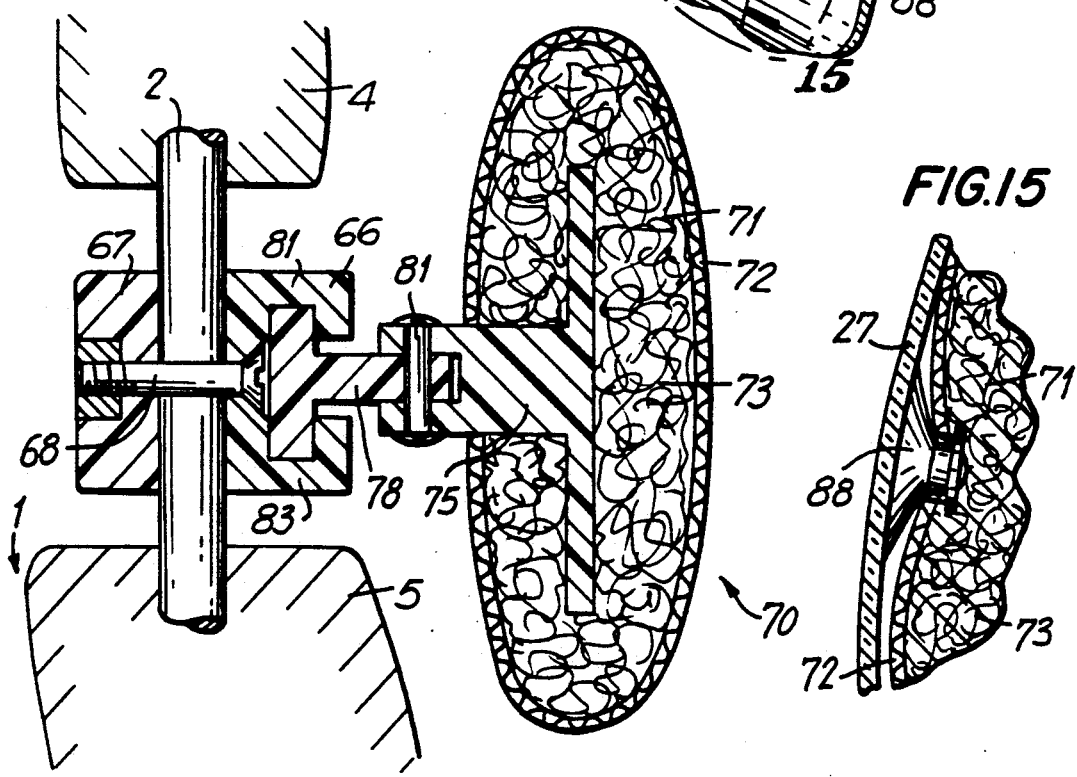

HEAD REST AND NECK SUPPORT ASSEMBLY

This is a continuation-in-part of application Ser. No. 07/320,326, filed on Mar. 8, 1989, now U.S. Pat. No. 4,971,393, issued Nov. 20, 1990.

BACKGROUND OF THE INVENTION

This invention is directed to a head rest and neck support assembly, and in particular, to a head rest and neck support assembly for seating furniture such as automobile seats.

Head rests and neck rests are known in the art. An example is disclosed in U.S. Pat. No. 4,881,777 where a vertical post is attached to an automobile seat and an upper head support and a lower head support swivel between use and disuse positions. Because the seat does not have its own back head rest, the upper support serves as a back head rest when in use. The lower support serves as a side head rest when in use.

The disadvantage of this and other head rests is that they cannot be used on seating furniture which either already has a separate back head rest or in which the furniture extends up behind the head. Thus, if a user has a particular seating furniture which either already has a separate back head rest or which otherwise extends behind the head, the user is not able to add a neck support or side head rest.

Another disadvantage is that the prior art head rests already form an integrated whole, either with the seating furniture or, as appears the case in U.S. Pat. No. 4,881,777, with the backboard portion of the automobile directly behind the seating furniture. Thus, if a user already has a particular seating furniture which does not already contain a side head rest or neck support, the user is unable to add these features.

Accordingly, a head rest and neck support assembly is desired which may be mounted onto a seating furniture already possessing a back head rest.

SUMMARY OF THE INVENTION

Generally speaking, in accordance with the instant invention, a head rest and neck support for seating furniture is provided. The head rest and neck support includes an elongated support bar which is mounted horizontally to the seating furniture behind the neck of a prospective user. One end of the support bar has a pivoting carrying element with a cushion attached thereto. The cushion may swivel between a neck support position and a side head rest position.

In a second embodiment, the elongated support bar in the assembly has a groove running the length of the bar. The cushion is also elongated and possesses a track or partial track which cooperates with the groove in the elongated support bar to allow the elongated cushion to slide horizontally along the bar. A portion of the track is capable of exiting the groove and allowing the elongated cushion to bend into an L-shape.

Accordingly, it is an object of the present invention to provide an improved head rest and neck support assembly.

Another object of the invention to provide a head rest and neck support assembly which will give either support to the side of the head or support to the back of the neck.

A further object of the invention is to provide a head rest and neck support assembly which gives simultaneous support to the side of the head and support to the back of the neck.

Still another object of the invention is to provide a head rest and neck support assembly for use on a seating furniture which has a back head rest already formed as part of the integrated whole.

Yet another object of the invention is to provide a head rest and neck support assembly for use on a seating furniture which already has a back head rest mounted onto the seating furniture with support tubes.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 7 is another frontal diagrammatic representation of the head rest and neck support assembly in accordance with the invention;

FIG. 8 is a cross-sectional view taken along line 8—8 of FIG. 7;

FIG. 13 is a frontal diagrammatic representation of a third embodiment of the head rest and neck support assembly in accordance with the invention;

FIG. 14 is a cross-sectional view taken along line 14—14 of FIG. 13;

FIG. 15 is a cross-sectional view taken along line 15—15 of FIG. 13;

DETAILED DESCRIPTION OF THE PREFERRED EMBODIMENTS

Figure 1:
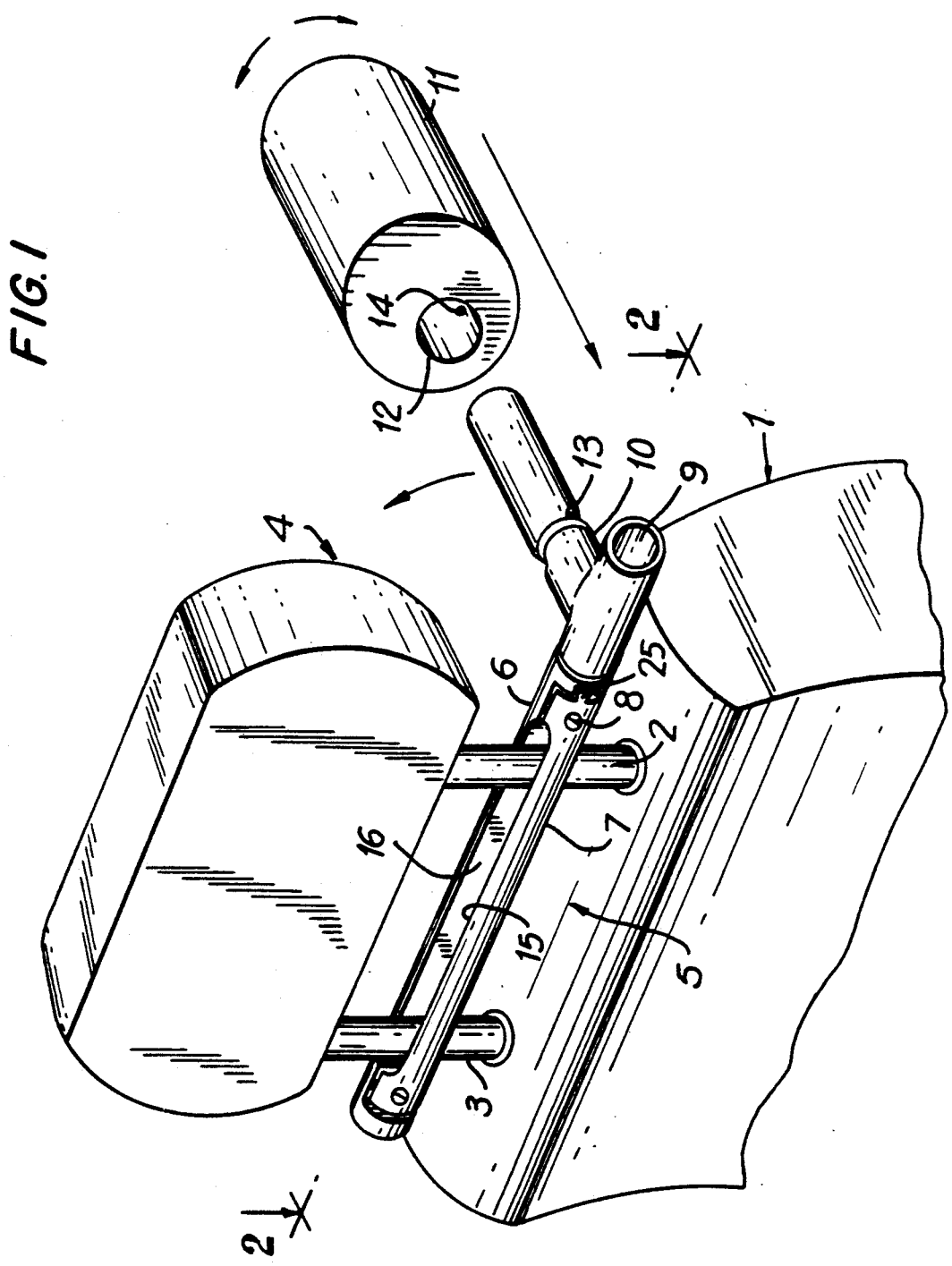
FIG. 1 is a frontal diagrammatic representation of a head rest assembly in accordance with the invention.
Figure 2:
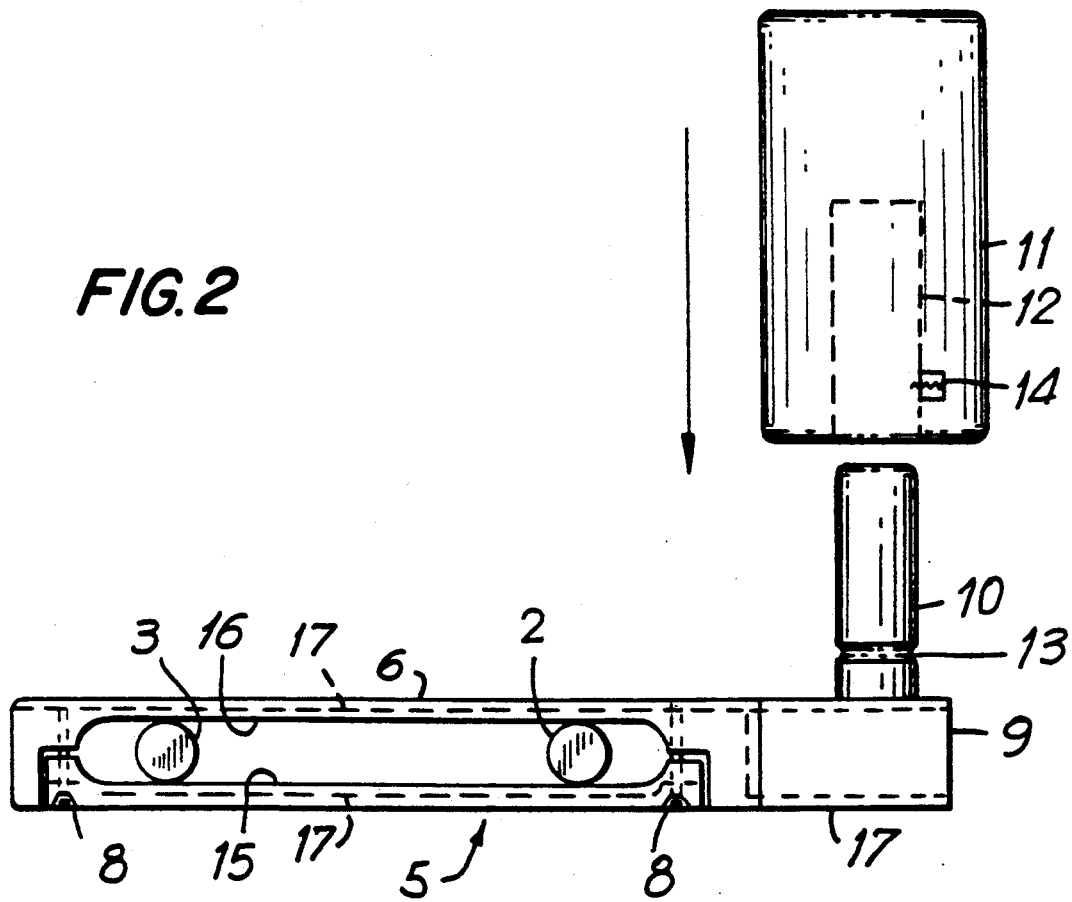
FIG. 2 is a cross-sectional view taken along line 2—2 of FIG. 1.

Reference is made to FIGS. 1 and 2 which illustrate a side head rest assembly according to the invention. A seating furniture, generally designated as 1, is a typical seat used in automobiles. Seating furniture 1 has a seat back 5 and back head rest 4 which is supported on seat back 5 by supporting tubes 2 and 3. Supporting tubes 2 and 3 permit vertical adjustment of back head rest 4.

The side head rest assembly contains an elongated support bar 6, carrying element 10 and cushion 11. Elongated support bar 6 is mounted onto support tubes 2 and 3 by enveloping the tubes in conjunction with back bar 7. Support bar 6 and back bar 7 each contain indentations 15 and 16, respectively, to define a space for support tubes 2 and 3. Support bar 6 and back bar 7 fit securely in place with the aid of dovetail guide 25 and are releasably secured together with screws 8. Support bar 6 and back bar 7 are preferably formed of a plastic material, and added strength is provided by metal core 17.

Carrying element 10 includes an axle 9 which is pivotally attached to elongated support bar 6 such that carrying element 10 swivels between a first use position as shown and upward into a second non-use position. Carrying element 10 also has a circular groove 13.

Cushion 11 contains a slotted hole 12 capable of being engaged by carrying element 10. A spring element 14 in slotted hole 12 can engage circular groove 13 to provide resistance to the removal of cushion 11 from carrying element 10. Cushion 11 has a substantially cylindrical shape and is made from a soft-elastic material.

When the head rest assembly is not in use, the cushion can be hinged up to allow free movement of the user. This hinging feature is particularly important if the seating furniture is in an automobile where the user must slide to the side of the seat to enter or exit the automobile.

Reference is now made to FIGS. 3–8 which illustrate a head rest and neck support assembly according to the invention. Although seating furniture 1 is depicted as an automobile seat located next to automobile door 26 and automobile window 27, the invention is not limited to automobile seats.

As in the side head rest assembly previously described, the head rest and neck support assembly, designated generally as 30, contains an elongated support bar 36, carrying element 40 and cushion 41. Elongated support bar 36 is also mounted onto support tubes 2 and 3 by enveloping the tubes in conjunction with back bar 37. Support bar 36 and back bar 37 are releasably secured together with screws 38.

Figure 4:
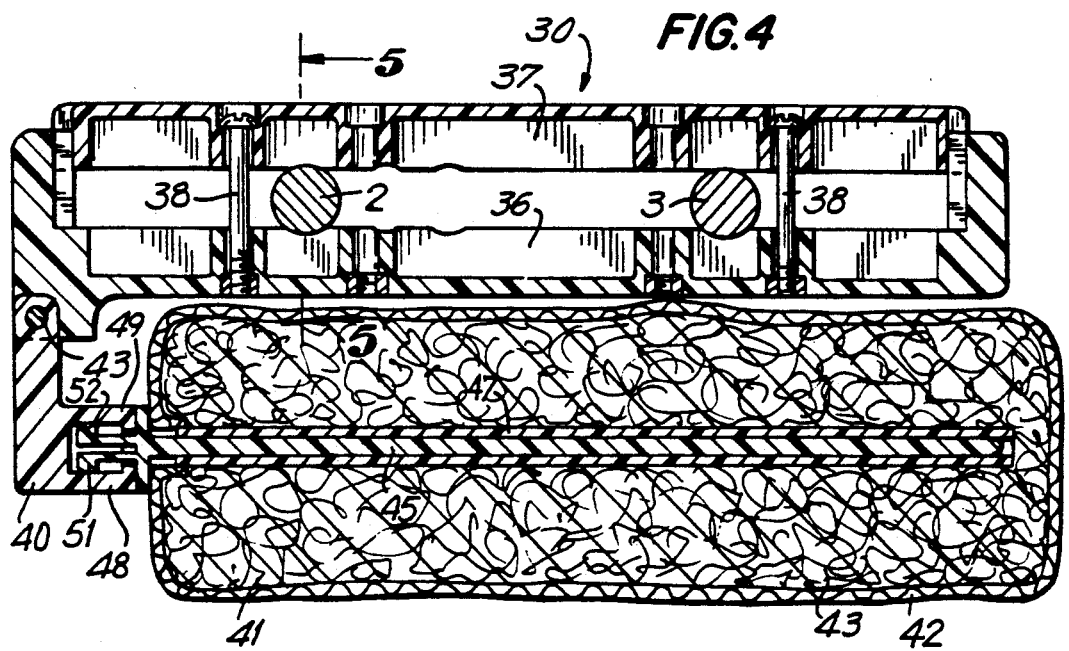
FIG. 4 is a cross-sectional view taken along line 4—4 of FIG. 3.
Figure 6:
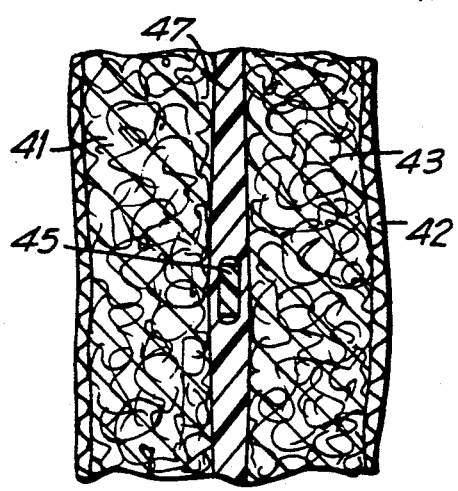
FIG. 6 is a cross-sectional view taken along line 6—6 of FIG. 3.
Figure 9:
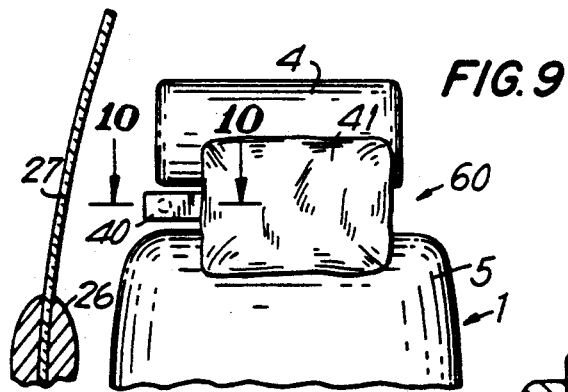
FIG. 9 is a frontal diagrammatic representation of a second embodiment of the head rest and neck support assembly in accordance with the invention.

Carrying element 40 is L-shaped attached to elongated support bar 36 by pivoting hinge 43. Pivoting hinge 43 allows carrying element 40 to swivel between a first neck support position as shown in FIG. 4 and a second head rest position as shown in FIG. 8. Carrying element 40 also has a guiding strip 45 as well as L-shaped arms 48 and 49 which define a space therein.

Cushion 41 contains a butterfly slot 47 which contains an opening capable of being engaged by guiding strip 45. Cushion 41 also has camming fingers 51 and 52 which are inserted between and trapped by L-shaped arms 48 and 49, thereby securing cushion 41 to carrying element 40. Cushion 41 is preferably substantially pillow-shaped and made from a fabric case 42 stuffed with foam rubber 43.

Figure 3:
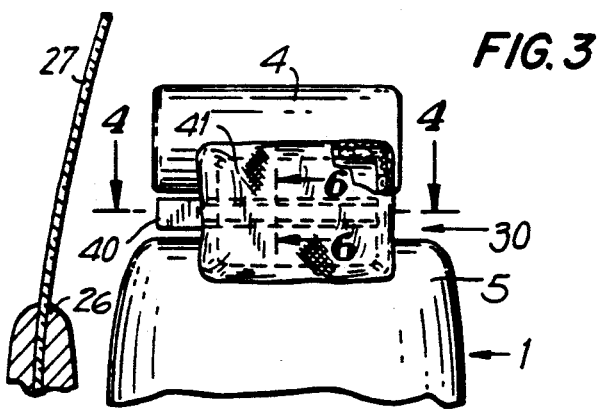
FIG. 3 is a frontal diagrammatic representation of a head rest and neck support assembly in accordance with the invention.
Figure 5:
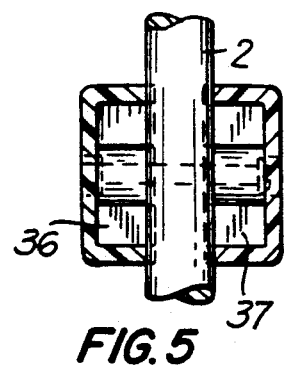
FIG. 5 is a cross-sectional view taken along line 5—5 of FIG. 4.

When the head rest and neck support assembly is in the neck support position as depicted in FIG. 3, the cushion provides support to the back of a user's neck. Additionally, the cushion is in a position so that free movement of the user is possible. When the head rest and neck support assembly is in the head rest position as depicted in FIG. 7, a user 50 may lean against cushion 41 to relax or sleep.

A variation of this head rest and neck support assembly is depicted at 60 in FIGS. 9–12. As in the previous assembly, cushion 41 can be in a neck supporting position, shown in FIG. 9, or a head rest position, shown in FIG. 12. In this variation, however, carrying element 40 also includes hinge element 55 and swivel element 58. Hinge element 55 is pivotally attached to support bar 36 with hinge 43. Hinge element 55 is pivotally connected to swivel element 58 by swivel 56.

Figure 10:
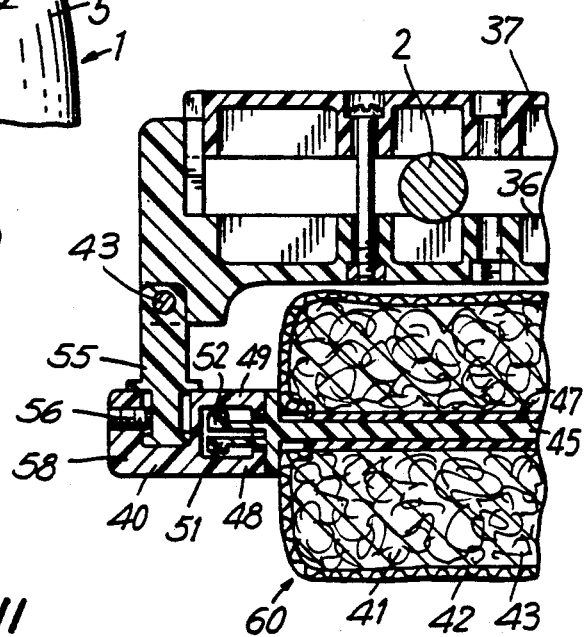
FIG. 10 is a cross-sectional view taken along line 10—10 of FIG. 9.
Figure 11:
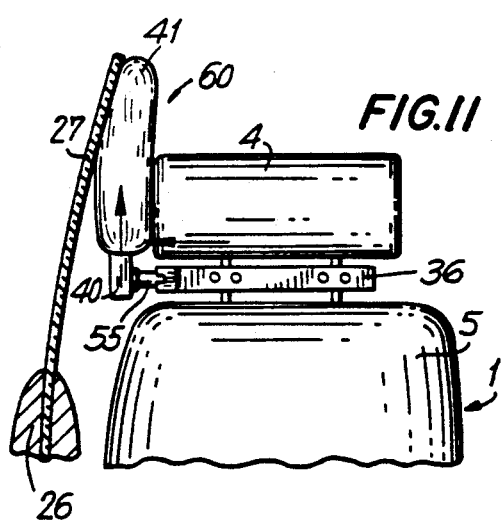
FIG. 11 is a second frontal diagrammatic representation of the head rest and neck support assembly as shown in FIG. 9.
Figure 12:
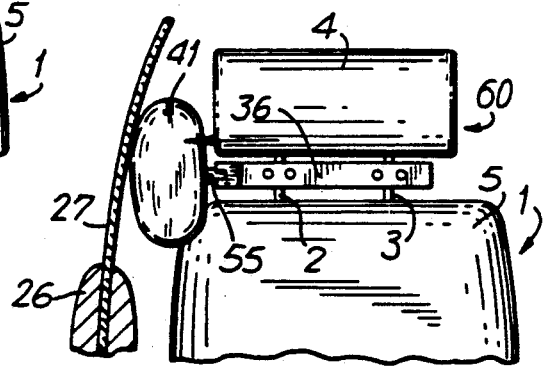
FIG. 12 is a third frontal diagrammatic representation of the head rest and neck support assembly as shown in FIG. 9.

Thus, in this embodiment, the user may swivel cushion 41 from the neck supporting position shown in FIG. 10 into a first upright position, and then pivot the pillow into the second upright position shown in FIG. 11 by swivelling hinge element 55 around hinge 43. The user may then swivel cushion 41 from the second upright position shown in FIG. 11 into the head rest position shown in FIG. 12. This variation has an advantage over the two-position assembly depicted in FIGS. 3–8 in that cushion 41 may be moved between the neck rest position and the head rest position without the user having to lean forward to avoid the swinging cushion.

A third variation of the head rest and neck support assembly is depicted at 70 in FIGS. 13–15. Elongated support bar 66 is mounted onto support tubes 2 and 3 by enveloping the tubes in conjunction with back bar 67, and support bar 66 and back bar 67 are releasably secured together with screws 68. Elongated support bar 66 includes elongated L-shaped arms 81 and 83 which together define T-shaped groove 85.

Elongated cushion 71 includes three position members 75, 76 and 77 which are substantially T-shaped and extend into elongated cushion 71. A suction cup 88 is attached to one end of elongated cushion 71. Elongated cushion 71 is preferably made from a fabric case 72 stuffed with foam rubber 73.

Position members 75, 76 and 77 are attached to T-shaped posts 78, 79 and 80, respectively, with screws 81 extending therethrough. T-shaped posts 78, 79 and 80 are adapted to fit into groove 85 and be slideably displaced therein between a solely neck support position depicted in FIG. 13 and a combination neck support and head rest position depicted in ghost in FIG. 13.

When head rest and neck support assembly 70 is in the neck support position, elongated cushion 71 provides support to the back of a user's neck. Additionally, the elongated cushion is in a position so that free movement of the user is possible. Elongated cushion 71 is moved into the combination neck support and head rest position by sliding T-shaped posts 78, 79 and 80 along T-shaped groove 85 until T-shaped post 78 exits T-shaped groove 85. Elongated cushion 71 bends into an L-shape such that a portion of elongated cushion 71 acts as a neck support and a portion acts as a head rest. Elongated cushion 71 may be releasably secured to a wall or car window by applying suction cup 88 thereon as depicted in FIG. 15.

Figure 16:
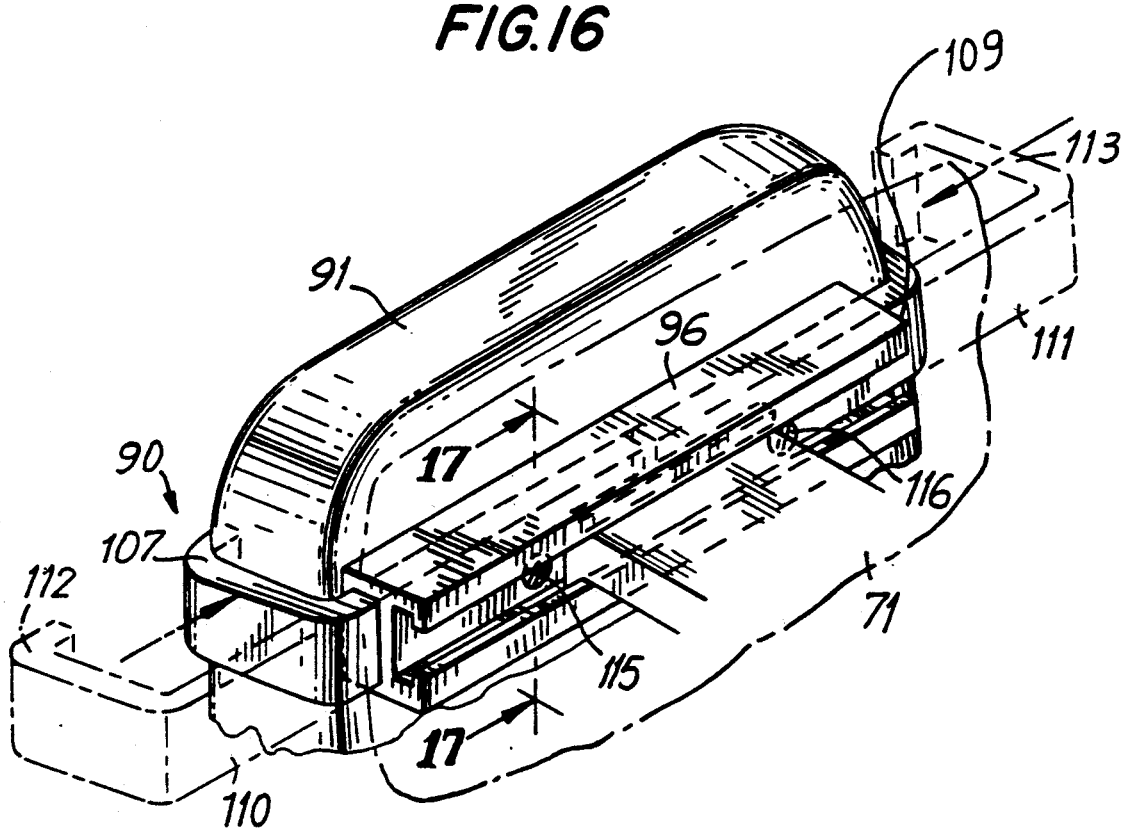
FIG. 16 is a frontal diagrammatic representation of a fourth embodiment of the head rest and neck support assembly in accordance with the invention.
Figure 17:
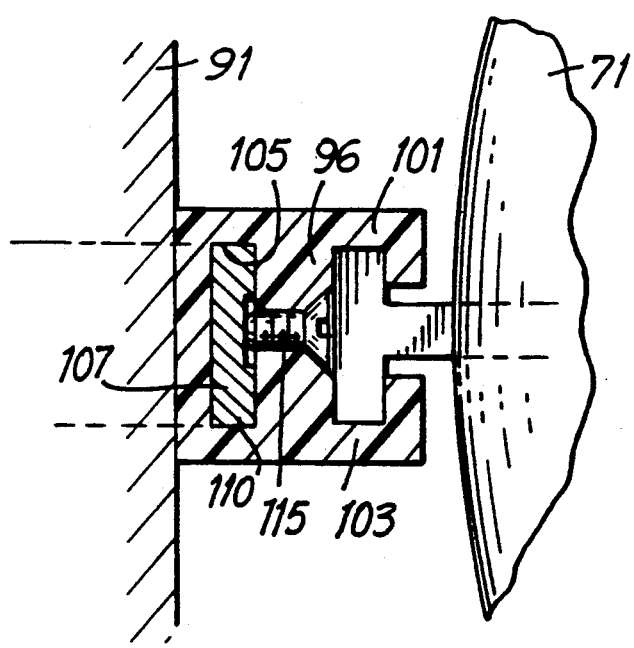
FIG. 17 is a cross-sectional view taken along line 17—17 of FIG. 16.

A variation in the mounting of head rest and neck support assembly 70 is depicted as 90 in FIGS. 16 and 17. Chair 91 does not contain support tubes and a separate back head rest but instead is of a sufficient height to extend behind a user's neck or head. In addition to L-shaped fingers 101 and 103, elongated support bar 96 defines an opening 105 extending through the length of the bar. Substantially Γ-shaped clamps 107 and 109 each include a long arm 110 and 111, respectively, and a hook 112 and 113, respectively, adapted to be capable of clutching the sides of seating furniture 91. Long arms 110 and 111 are adapted to be slideably received in opening 105 between a first release position, depicted in ghost in FIG. 16, and a second mounted position, depicted in FIG. 16. Screws 115 and 116 extend through elongated support bar 96 and exert pressure on arms 110 and 111 to secure them in the second mounted position.

Figure 18:
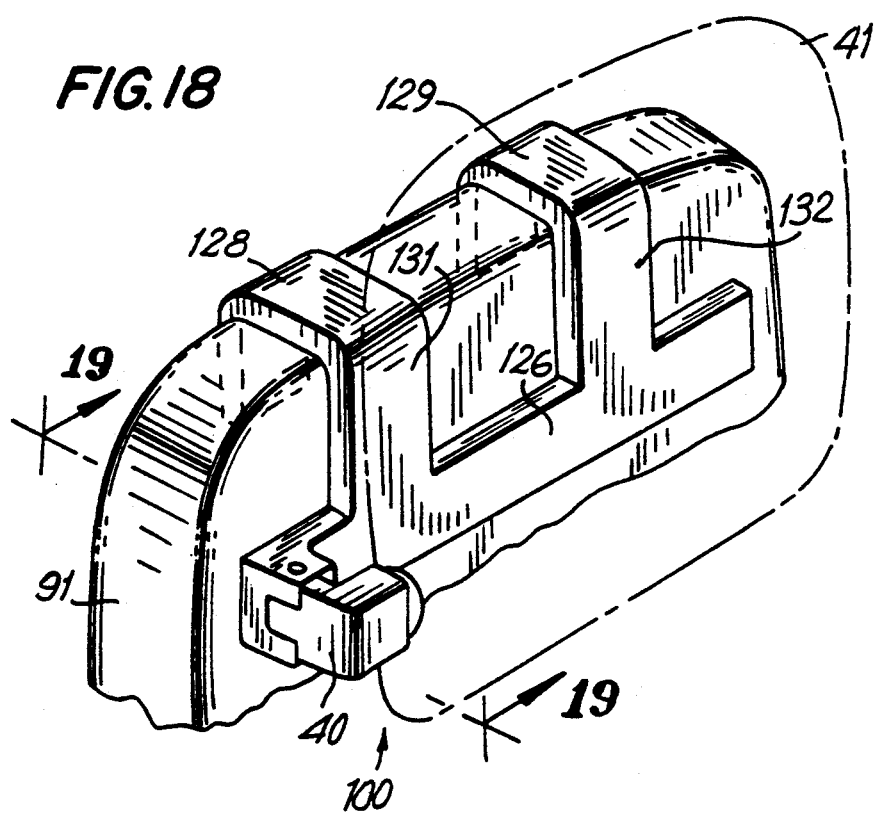
FIG. 18 is a frontal diagrammatic representation of a fifth embodiment of the head rest and neck support assembly in accordance with the invention.
Figure 19:
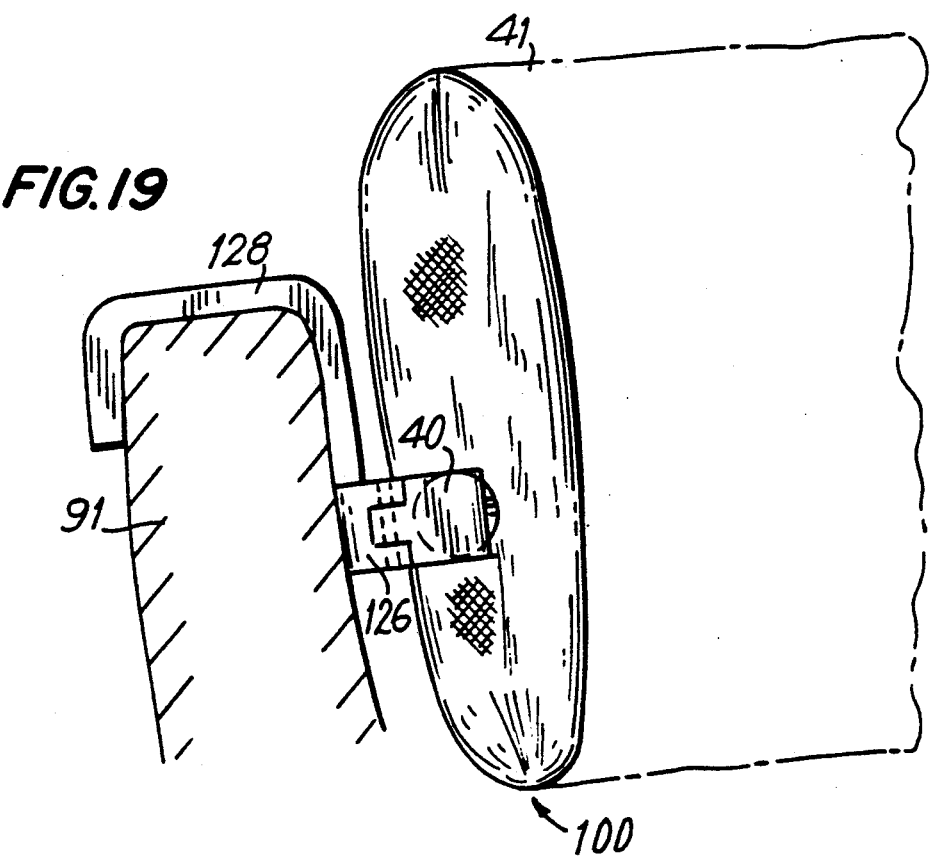
FIG. 19 is a cross-sectional view taken along line 18—18 of FIG. 18.

Another variation in the mounting of head rest and neck support assembly 30 is depicted as 100 in FIGS. 18 and 19. Again, chair 91 does not contain support tubes and a separate back head rest but instead is of a sufficient height to extend behind a user's neck or head. Elongated support bar 126 is attached to two n-shaped support hooks 128 and 129 at arms 131 and 132, respectively. Hooks 128 and 129 are adapted to be positioned over seating furniture 91 to secure elongated support bar 126 in its horizontal position.

It is anticipated that any of the mounting apparatuses described above can be used with any of the head rest and neck support assemblies. The advantage of the head rest and neck support assemblies described above in accordance with the invention is that if the user has a particular seating furniture such as an automobile seat which has a separate back head rest or otherwise extends behind the head, the assemblies enable the user to attach a neck support and side head rest assembly.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A head rest and neck support assembly for seating furniture comprising:

elongated support means including a front bar and a rear bar;

mounting means for mounting the elongated support means to the seating furniture such that the front bar and rear bar are adapted to be selectively attached to the seating furniture in a substantially horizontal position at a location approximately behind the neck of a user if a user sat in the seating furniture;

a carrying element pivotally connected to the support means at a first end thereof so that the carrying element is adapted to be swivelled between a first neck support position substantially parallel to the support means and a second head rest position substantially perpendicular to the support means, and wherein the support means, the carrying element in the first neck support position and the carrying element in the second head rest position are all substantially in the same horizontal plane; and a cushion attached to the carrying element so that the cushion is swivelled between the first neck support position and the second head rest position.

2. The head rest and neck support assembly of claim 1, wherein the carrying element is pivotally connected to the support means with a hinge.

3. The head rest and neck support assembly of claim 1, wherein the mounting means is adapted to be secured to a seating furniture having a back-head rest mounted to the seating furniture by supporting tubes, and the front bar and rear bar are adapted to be secured to the supporting tubes.

* * * * *